United States Patent [19]
Jennings, III et al.

[11] Patent Number: 5,920,884
[45] Date of Patent: Jul. 6, 1999

[54] NONVOLATILE MEMORY INTERFACE PROTOCOL WHICH SELECTS A MEMORY DEVICE, TRANSMITS AN ADDRESS, DESELECTS THE DEVICE, SUBSEQUENTLY RESELECTS THE DEVICE AND ACCESSES DATA

[75] Inventors: Earle Willis Jennings, III, San Jose, Calif.; Jong Seuk Lee, Seongnan, Rep. of Korea

[73] Assignee: Hyundai Electronics America, Inc., San Jose, Calif.

[21] Appl. No.: 08/873,979

[22] Filed: Jun. 12, 1997

Related U.S. Application Data

[60] Provisional application No. 60/026,640, Sep. 24, 1996.
[51] Int. Cl.$^6$ ....................................................... G06F 13/00
[52] U.S. Cl. ............................ 711/102; 711/114; 711/167; 711/1; 711/154; 365/230.08
[58] Field of Search ........................... 365/230.08; 711/1, 711/102, 103, 154, 167, 169

[56] References Cited

U.S. PATENT DOCUMENTS

| | | | |
|---|---|---|---|
| 5,396,468 | 3/1995 | Harari et al. | 365/218 |
| 5,418,752 | 5/1995 | Harari et al. | 365/218 |
| 5,430,859 | 7/1995 | Norman et al. | 711/103 |
| 5,438,573 | 8/1995 | Mangan et al. | 371/10.3 |
| 5,471,478 | 11/1995 | Mangan et al. | 371/10.3 |
| 5,508,971 | 4/1996 | Cernea et al. | 365/185.23 |
| 5,602,987 | 2/1997 | Harari et al. | 395/182.06 |
| 5,721,708 | 2/1998 | Tsai et al. | 365/230.08 X |
| 5,841,729 | 11/1998 | Ooishi | 365/230.08 |

Primary Examiner—David L. Robertson
Attorney, Agent, or Firm—Townsend & Townsend & Crew LLP

[57] ABSTRACT

A non-volatile memory access protocol that facilitates concurrent accessing operations to multiple non-volatile memory components. This approach provides significant speed advantages over prior art non-volatile protocols. Also, power consumption is reduced in comparison to prior art synchronous protocols used for volatile memory because each memory component need not be continuously selected.

36 Claims, 13 Drawing Sheets

NONVOLATILE MEMORY INTERFACE PROTOCOL WHICH SELECTS A MEMORY DEVICE, TRANSMITS AN ADDRESS, DESELECTS THE DEVICE, SUBSEQUENTLY RESELECTS THE DEVICE AND ACCESSES DATA

This application claims the benefit of U.S. provisional application No. 60/026,640, filed Sep. 24, 1996, the disclosure of which is incorporated by reference.

BACKGROUND OF THE INVENTION

The present invention relates to non-volatile memory systems and more particularly to non-volatile memory access protocols.

When a memory component is accessed for storage or retrieval, various information is exchanged between the accessing entity and the memory. The accessing entity informs the memory whether the access is for the purpose of storage or retrieval, and the location of the stored data to be accessed. In some memory systems, the amount of data to be stored or retrieved in a single operation is also specified. The memory component in turn returns stored data when the accessing operation is for retrieval. When the accessing operation is for storage, the memory component receives the data to be stored.

A memory access protocol specifies the physical paths and timing of this information exchange. In one well known type of memory access protocol, address information and data are presented simultaneously on independent buses. A complete access operation occurs in a single cycle. A disadvantage of this approach is that each memory component must have a large number of pins to allow for connection to the two independent buses.

An alternative approach is the so-called multiple cycle command access protocol. In this type of protocol, a single collection of pins are used for communicating address information and data. A particular memory component is kept in a selected state for multiple cycles of the common bus while address information and data are exchanged between the accessing entity and the memory component.

Previous memory access protocols have been primarily developed for volatile memory as would be used for intermediate storage of software and data in a computer system. Non-volatile memory systems are becoming prevalent as replacements for disk drives in computer systems. These systems typically include large numbers of high capacity non-volatile memory components.

The desired characteristics of solid state non-volatile memory systems render previous memory access protocols problematic. Consider a non-volatile memory system that includes 64 non-volatile memory components, each storing 4 Megabytes of data. If each accessible data word is to be 16 bits wide, the data bus will require 16 lines and the address bus will require 20 lines. Thus, each non-volatile memory component will require 36 pins for bus operation only. Such a large pin count increases the size of each component package and thus the size of the whole non-volatile memory system. Furthermore, the large number of bus lines complicates board design in that each line must be routed to each component.

The multiple cycle command access protocol reduces the number of pins since address and data bus lines are shared. However, the pin count reduction comes at the expense of speed since the same bus must be used repeatedly for a single memory access. Speed has been increased in non-volatile memory systems by use of synchronous variants of the basic multiple cycle command access protocol, wherein the accessing entity specifies address information once but then receives a stream of successive words from the non-volatile memory component in response. Interleaving techniques are also known wherein while a first memory component is preparing a response to a memory access, other memory components on a common bus may be accessed. Neither synchronous techniques nor interleaving have been applied to non-volatile memory systems.

U.S. Pat. No. 5,430,859 discloses a serial protocol wherein address and data information are distributed among non-volatile memory using a very small number of lines. This protocol provides for simple packaging, routing and board layout but is very slow. What is needed is a non-volatile memory access protocol that provides high speed and moderate pinout and routing requirements.

SUMMARY OF THE INVENTION

The present invention provides a non-volatile memory access protocol that facilitates concurrent accessing operations to multiple non-volatile memory components. This approach provides significant speed advantages over prior art non-volatile protocols. Also, power consumption is reduced in comparison to prior art synchronous protocols used for volatile memory because each memory component need not be continuously selected.

In accordance with a first aspect of the invention, a method of operating a plurality of non-volatile memory devices includes steps of: selecting a first non-volatile memory device to initiate a selected state of the first non-volatile memory device, during the selected state, transmitting information identifying a location to be accessed at the first non-volatile memory device, thereafter causing the location identifying information to be stored in a location register of the first-non volatile memory device, after transmitting the location identifying information, terminating the selected state of the first non-volatile memory device, reselecting the first non-volatile memory device to again initiate the selected state of the first non-volatile memory device, and thereafter accessing a data word from the first non-volatile memory device, the data word being stored at a location determined by the location identifying information.

In accordance with a second aspect of the invention, a method of operating a plurality of non-volatile memory devices includes steps of selecting a first non-volatile memory device to initiate a selected state of the first non-volatile memory device, during the selected state, transmitting information identifying a location to be accessed at the first non-volatile memory device, thereafter transmitting the location identifying information, terminating the selected state of the first non-volatile memory device, reselecting the first non-volatile memory device to again initiate the selected state of the first non-volatile memory device, and thereafter accessing a data word from the first non-volatile memory device, the data word being stored at a location determined by the location identifying information.

In accordance with a third aspect of the present invention, a non-volatile memory system includes: a plurality of non-volatile memory devices, each non-volatile memory device being driven into a selected state by a particular pattern of selection line input states, and a memory interface system that performs the steps of: activating selection line input states of a first non-volatile memory device to initiate a selected state of the first non-volatile memory device, during the selected state, transmitting information identifying a location to be accessed at the first non-volatile memory device, thereafter terminating the selected state of the first non-volatile memory device after transmitting the location identifying information, reselecting the first non-volatile memory device to again initiate the selected state of the first non-volatile memory device, and thereafter accessing a data word from the first non-volatile memory device, the data word being stored at a location determined by the location identifying information.

In accordance with a fourth aspect of the present invention, a non-volatile memory interface includes: a selection circuit that selects a first non-volatile memory device to initiate a selected state of the first non-volatile memory device, a location transmitting circuit that, during the selected state, transmitting information identifying a location to be accessed at the first non-volatile memory device, a selected state terminating circuit that after transmission of the location identifying information, terminates the selected state of the first non-volatile memory device, a reselection circuit that reselects the first non-volatile memory device to again initiate the selected state of the first non-volatile memory device, and an access circuit that accesses a data word from the first non-volatile memory device, the data word being stored at a location determined by the location identifying information.

A further understanding of the nature and advantages of the inventions herein may be realized by reference to the remaining portions of the specification and the attached drawings.

DESCRIPTION OF SPECIFIC EMBODIMENTS

The present invention provides, e.g., a communications protocol between non-volatile memory devices and circuitry controlling such devices. Non-volatile memories such as flash memory devices characteristically have three operations: reading, writing, and erasure. The present invention permits several operations to various devices to be concurrently active. A non-volatile memory device need not be continuously selected during access. This feature permits for great power savings. One application of the present invention is a non-volatile memory system that acts as a replacement for a fixed disk drive.

Figure 1:
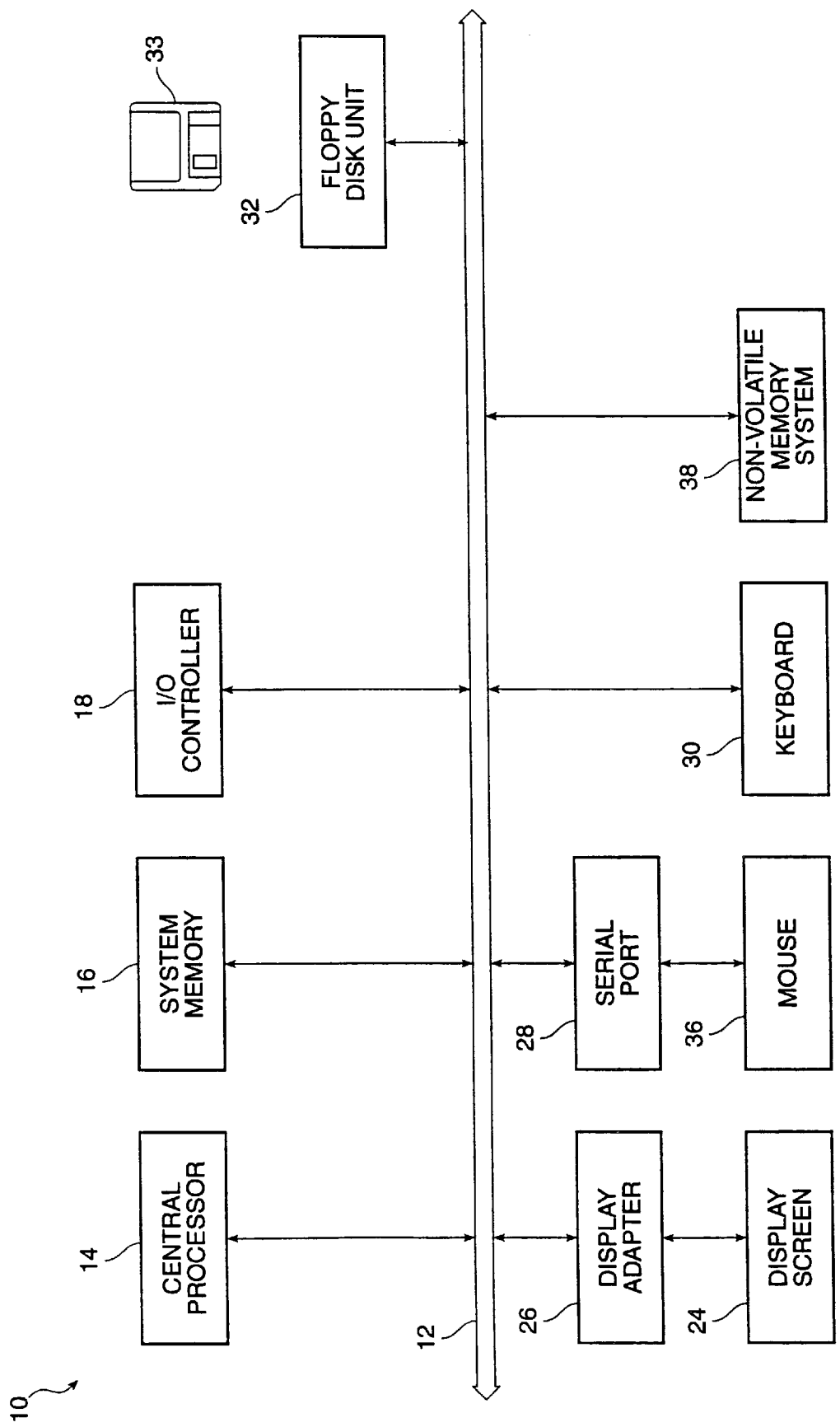
FIG. 1 depicts a computer system employing a non-volatile memory system in accordance with one embodiment of the present invention.

FIG. 1 depicts a computer system 10 employing a non-volatile memory system in accordance with one embodiment of the present invention. Computer system 10 includes a bus 12 which in turn connects major subsystems such as a central processor 14, a system memory 16, an input/output controller 18, a display screen 24 via a display adapter 26, a serial port 28, a keyboard 30, a floppy disk drive 32 operative to receive a floppy disk 33, and a mouse 36 connected via serial port 28. Instead of having a fixed disk drive, computer system 10 is instead equipped with a non-volatile memory system 38. Non-volatile memory system 38 interacts with computer system 10 as if it were a fixed disk drive with a conventional fixed disk drive controller, preferably an IDE controller.

Figure 2:
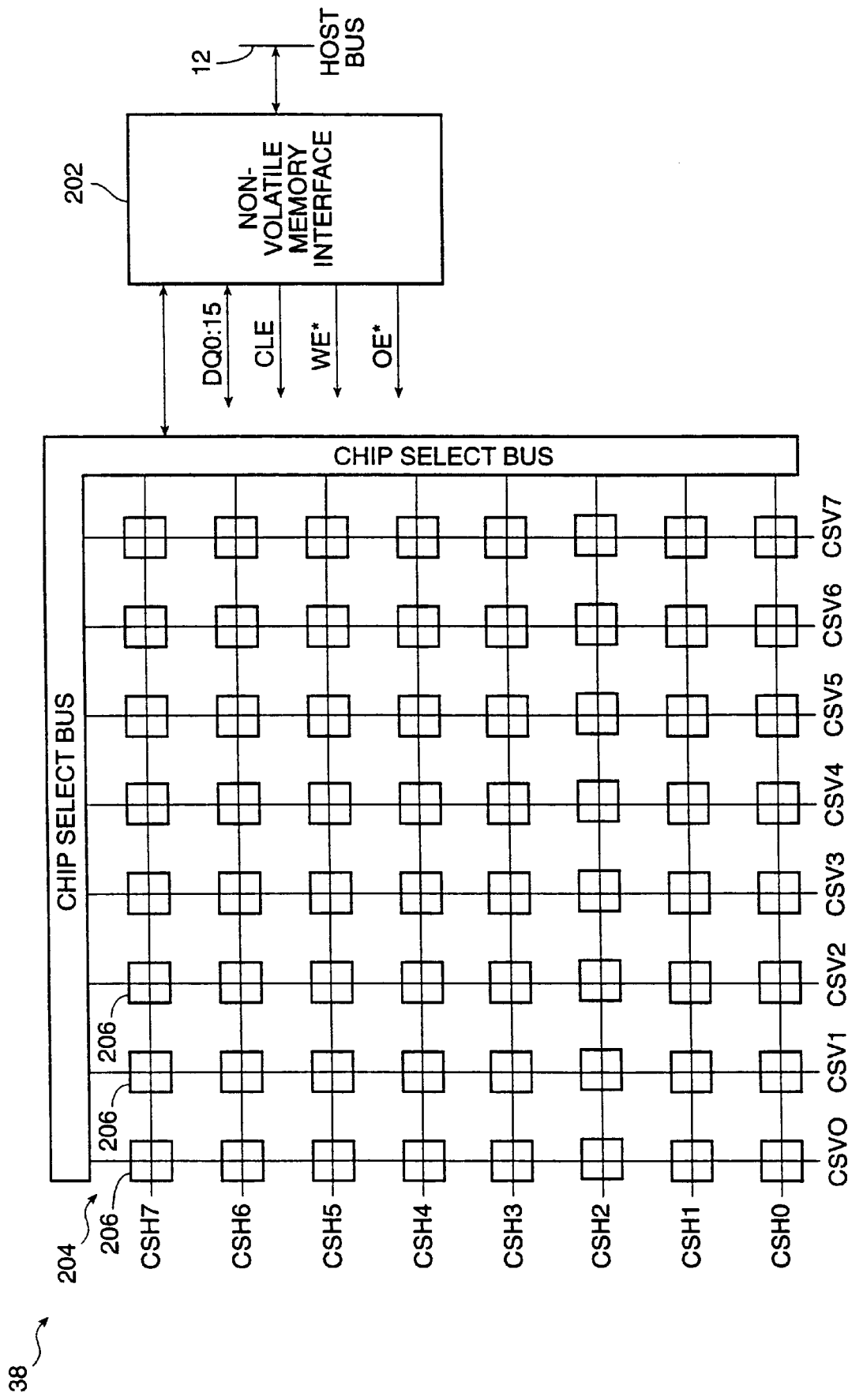
FIG. 2 depicts a non-volatile memory system in accordance with one embodiment of the present invention.

FIG. 2 depicts non-volatile memory system 38 in accordance with one embodiment of the present invention. Non-volatile memory system 38 includes a non-volatile memory interface 202 and an array 204 of individual non-volatile memory devices. In a preferred embodiment, there are 64 non-volatile devices. Each non-volatile device 206 of array 204 stores 4 megabytes of data. This gives 256 megabytes of storage capacity for non-volatile memory system 38. Each non-volatile memory device 206 receives two chip select signals generated by non-volatile memory interface 202. If the non-volatile memory devices are understood to be arranged in an array of rows and columns, each row has an associated horizontal chip select signal, one of CSH0–CSH7, and each column has an associated column select signal, one of CSV0–CSV7. Each non-volatile memory device 206 is addressed by a single horizontal chip select signal and a signal vertical chip select signal. When both are asserted the non-volatile memory device is placed into a selected state to accept commands, data, or be prompted for data to be read out.

Furthermore, a common 16 bit data bus (DQ0:15) interconnects non-volatile memory interface 202 and non-volatile memory devices 206. The individual interconnections of the data bus are not shown. Non-volatile memory interface 202 generates three further signals that are distributed to the non-volatile memory devices 206 for the purpose of synchronizing bus operation. A CLE signal is used to enable writing to a command register on a non-volatile memory devices 206. A WE* signal acts as a active low write enable input to non-volatile memory devices 206. An OE* signal acts as an active low output enable signal to non-volatile memory devices 206. The distribution of the data bus and the CLE, WE*, and OE* signals is not shown. Non-volatile memory interface 202 also exchanges information with host bus 12. Non-volatile memory interface 202 receives ATA commands and information to be stored. Non-volatile memory interface 202 sends retrieved information back to host bus 12.

Figure 3:
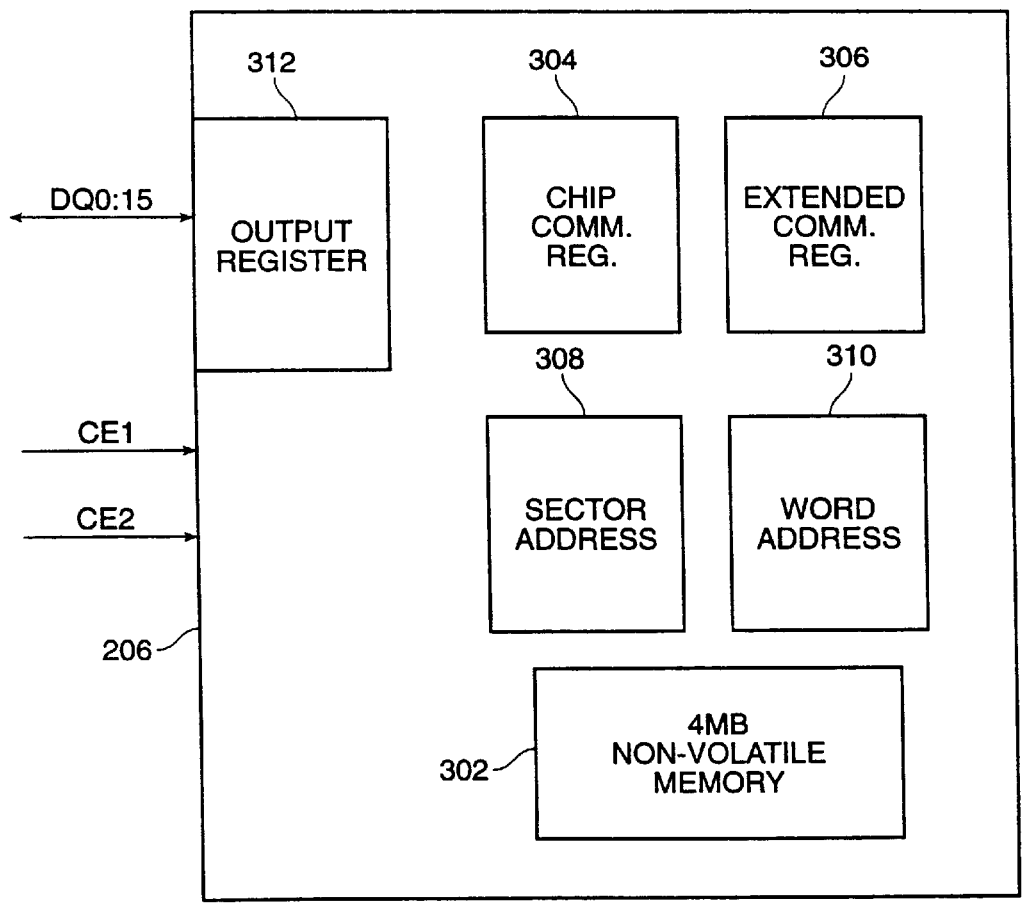
FIG. 3 depicts a non-volatile memory component in accordance with one embodiment of the present invention.

FIG. 3 depicts a non-volatile memory device or component in accordance with one embodiment of the present invention. Non-volatile memory device 206 includes a four megabyte non-volatile memory array 302, various control registers including a chip command register 304, a extended command register 306, a sector address register 308, a word address register 310, and an output register 312. There are two chip select signals, CE0* and CE1*, which couple to the horizontal and vertical chip select signals specified by the position of non-volatile memory device 206 within array 204.

Non-volatile memory array 302 includes 32 planes. Each plane includes two blocks. Each block includes 128 sectors. Each sector includes 264 16 bit words and corresponds to the standard 512 byte MSDOS sector plus 16 bytes for various overhead uses such as error control code bits, a count of the number of times a sector has been erased, a logical sector number, and various flag bits.

Non-volatile memory device 206 is capable of various operations which are selected by writing to the various registers. Chip command register 304 may store the following 3 bit commands:

| Code | Function | Description |
| --- | --- | --- |
| 0 | Extended Command | Next Cycle writes Address Register and External Command |
| 1 | READ_SECTOR | Read Word, Increment Word Address |
| 2 | READ_WORD | Write Address Register, then Read Address |
| 3 | WRITE_WORD | Write Address Register, then Write Address |
| 4 | ERASE_SECTOR | Erase the Sector in Sector Register |
| 5 | SUSPEND_ERASE | Stop and save erase process state |
| 6 | RESTORE_ERASE | Restore and resume erase process |

Thus, non-volatile memory device 206 may read or erase by sector, or read or write by word. If the operation to be performed is on a sector, the sector is specified by the contents of sector address register 308. If the operation is to be performed on a single word, the word is specified by the contents of word address register 310.

Chip command register 304 and sector address register 308 are written by the data bus contents when CLE is high, WE* goes low and CE0* and CE1* are both already low. Chip command register 304 is set by the top three bits of the data bus, DQ[13:15] and sector address register 308 is set by the remaining 12 bits of the data bus.

Word address register 310 is a 9 bit register. The process for setting the contents of word address register 310 depends on the contents of chip command register 304. When an entire sector is to be read, chip command register 304 holds a read sector command. Word address register 310 is then set to zero simultaneously with the writing of the read sector command to chip command register 304. Then when OE* falls and CE0* and CE1* are low the contents of word address register 310 increment so that the next read will be to the next word in the sector.

By contrast, when only a single word is to be written or read, chip command register 304 holds a read word or write word command. After the read word or write word command has been written to chip command register 304, and upon the next falling edge of WE* while CE0* and CE1* are both low, word address register 310 is set to the contents of the DQ[0:8] pins. Word address register 310 then specifies a specific word to be read or written.

Extended command register 306 holds 7 bits. The extended commands are as follows:

| Code | Function | Description |
| --- | --- | --- |
| 0x00 | Nop | No Operation |
| 0x01 | ERASE_BLOCK | Erase Block(32K words) in top 6 bits Address Register |
| 0x02 | MULTI_ERASE | Erase all blocks that are not protected |
| 0x03 | UNPROTECT | Unprotect ALL Blocks |
| 0x04 | PROTECT | Set Protection Bit for Block Number in Address Register |
| 0x05 | Reserved | |
| ... | | |
| 0x3f | Reserved | |

Figure 4:
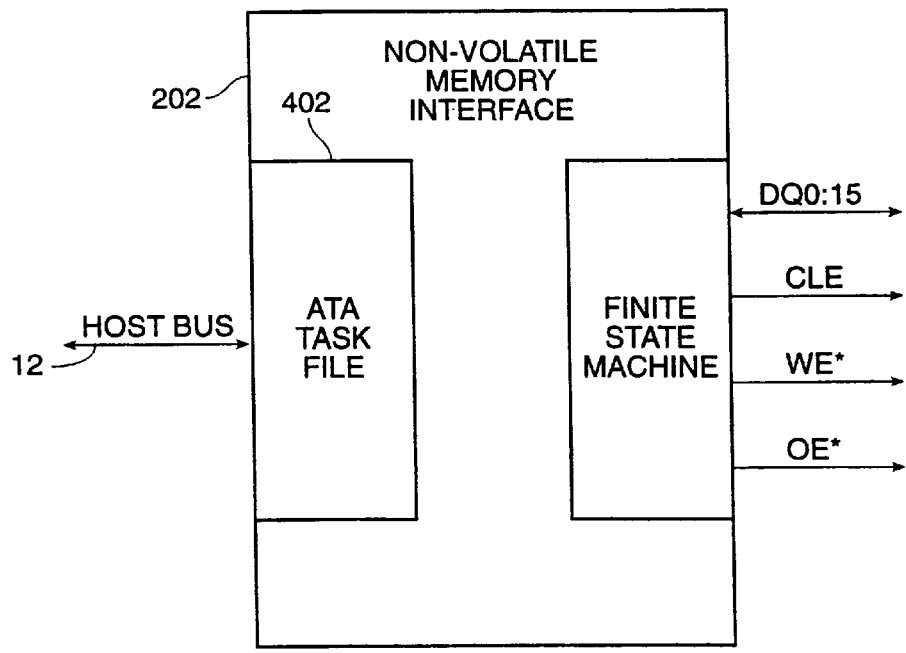
FIG. 4 depicts a non-volatile memory interface component in accordance with one embodiment of the present invention.

FIG. 4 depicts a non-volatile memory interface component 202 in accordance with one embodiment of the present invention. Non-volatile memory interface component 202 interacts with host bus 12 as if it were the controller to a conventional hard disk drive. Accordingly non-volatile memory interface component 202 includes an ATA task file 402 which includes a series of registers used to exchange information during the course of storage and retrieval. An explanation of the ATA task file is found in Messmer, The Indispensable PC Hardware Book, 2nd ed., (Addison Wesley 1995), the contents of which are herein incorporated by reference for all purposes. Non-volatile memory interface 202 receives the standard ATA commands via ATA task file 402 and operates a finite state machine 404 which places the proper outputs on the data bus, and on the CLE, WE*, and OE* lines. Non-volatile memory interface component 202 may also apply an error correcting code to data to be stored and remove the code from data to be retrieved.

Figure 5A:
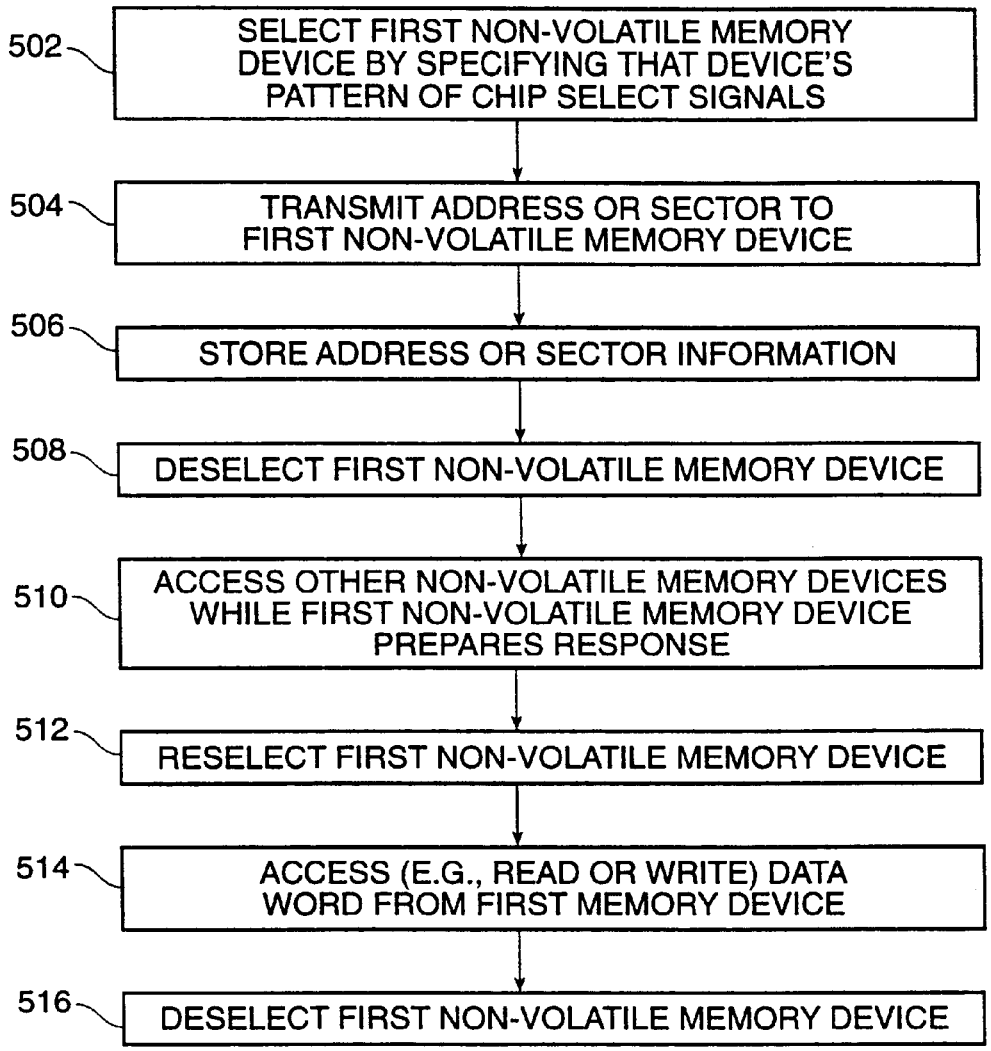
FIGS. 5A–5B depict flowcharts generally describing steps of accessing a non-volatile memory in accordance with one embodiment of the present invention.

FIG. 5A depicts a flowchart generally describing steps of accessing a non-volatile memory in accordance with one embodiment to the present invention. At step 502, non-volatile memory interface component 202 selects a first non-volatile memory device to initiate a selected state of the non-volatile memory device. At step 506, location identifying information for a memory access is transferred to non-volatile memory device 206 and stored in a register. This location identifying information may identify a sector in which case it is stored in sector address register 308, or may identify a particular word to be accessed in which case it is stored in word address register 310. Then in step 508 the selected state of first non-volatile memory device is terminated by deactivating the appropriate chip select signals. In a preferred embodiment, there is also a serial or parallel step of sending a command to non-volatile memory device 206 to identify the type of memory access.

At step 510, while the first non-volatile memory device prepares a response to the access requested at steps 504 and 506, other non-volatile memory devices may be accessed. At step 512, the first non-volatile memory device is reselected by activating its chip select signals. At step 514, a particular data word is read from or written to the first non-volatile memory device. Then at step 516 the first non-volatile memory device is deselected by deactivating its chip select signals.

Figure 5B:
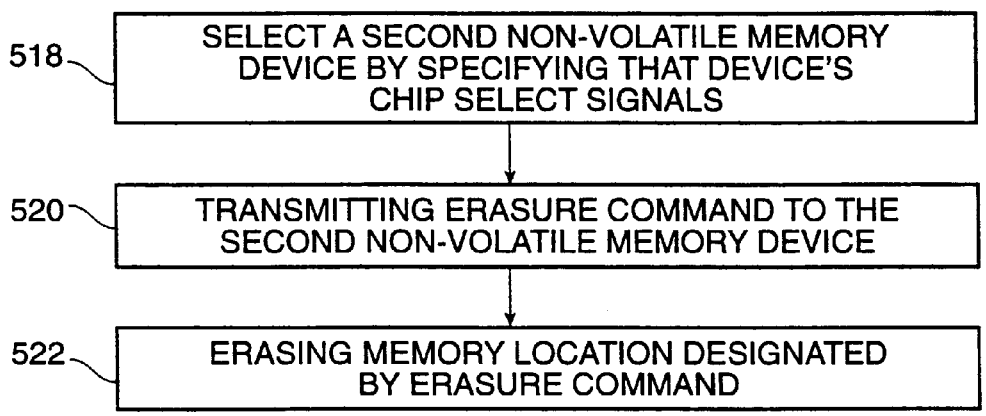

FIG. 5B generally describes steps of erasing specified memory locations of a non-volatile memory device in accordance with one embodiment of the present invention. At step 518, a second non-volatile memory device is selected by specifying that device's chip select signals. At step 520, an erase command is transmitted to the second non-volatile memory device. At step 522, the memory location designated by the erase command is erased.

Figure 6:
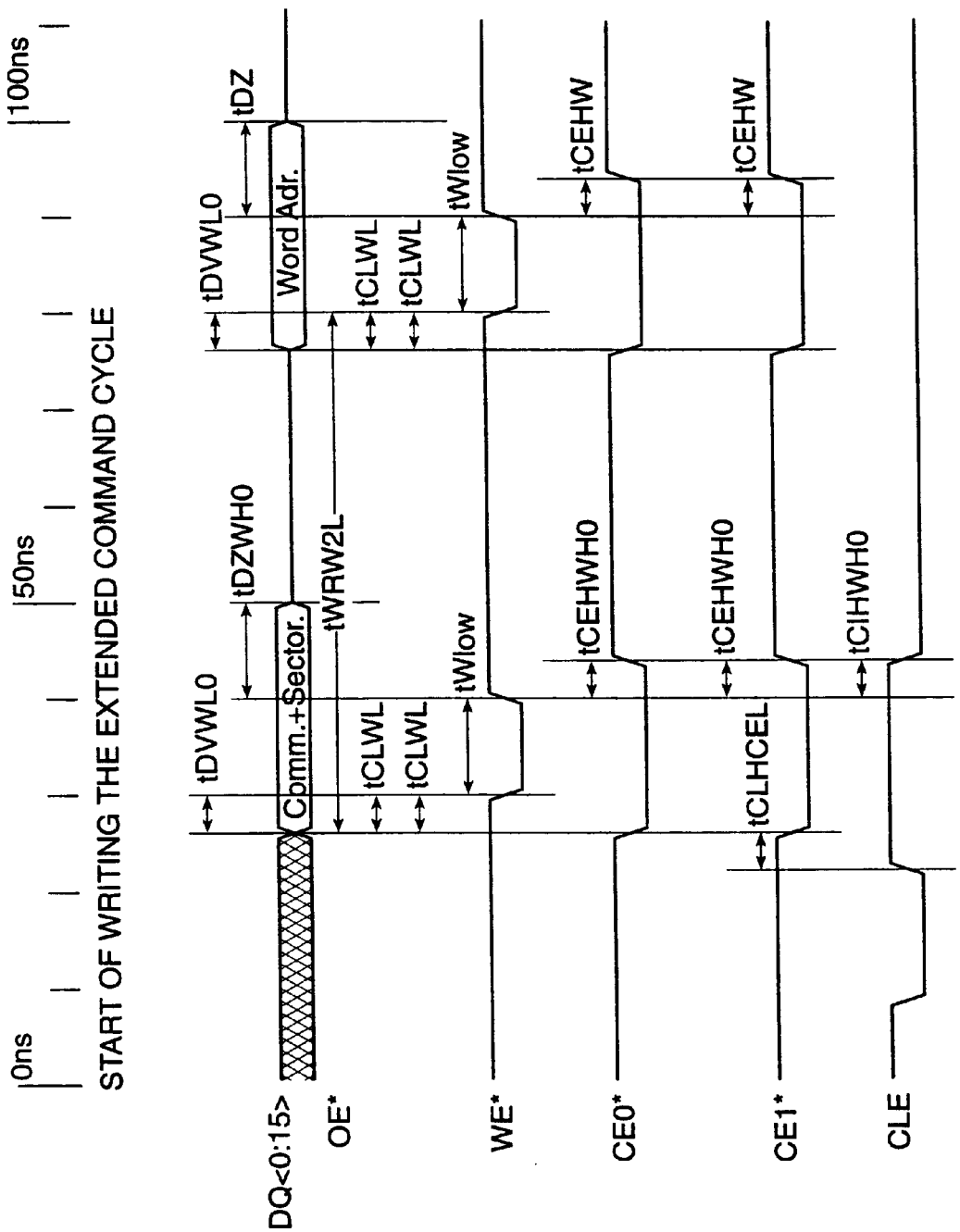
FIG. 6 depicts a timing diagram for writing into an external command register of a non-volatile memory component in accordance with one embodiment of the present invention.

FIG. 6 depicts a timing diagram for writing into extended command register 306 in accordance with one embodiment of the present invention. Initially, CLE is asserted, CE0* and CE1* are forced low to select non-volatile memory device 206, and the data bus is asserted with the bits corresponding to the command register contents being set to the value corresponding to the command for loading an extended command (code 0). Then WE* should be forced low and should stay low for a minimum time period as depicted in FIG. 6. After WE* returns to an asserted state, CLE goes low, either CE0* or CE1* may go high and the data bus may go to a high impedance state. Then before WE* again goes low both CE0* and CE1* should be set low and the data bus must be asserted with the DQ <9:15>bits set to the extended command to be loaded. The other bits of the data bus indicate a word address. When WE* goes low for the second time the data on the data bus is forced into extended command register 306 and word address register 310.

Figure 7:
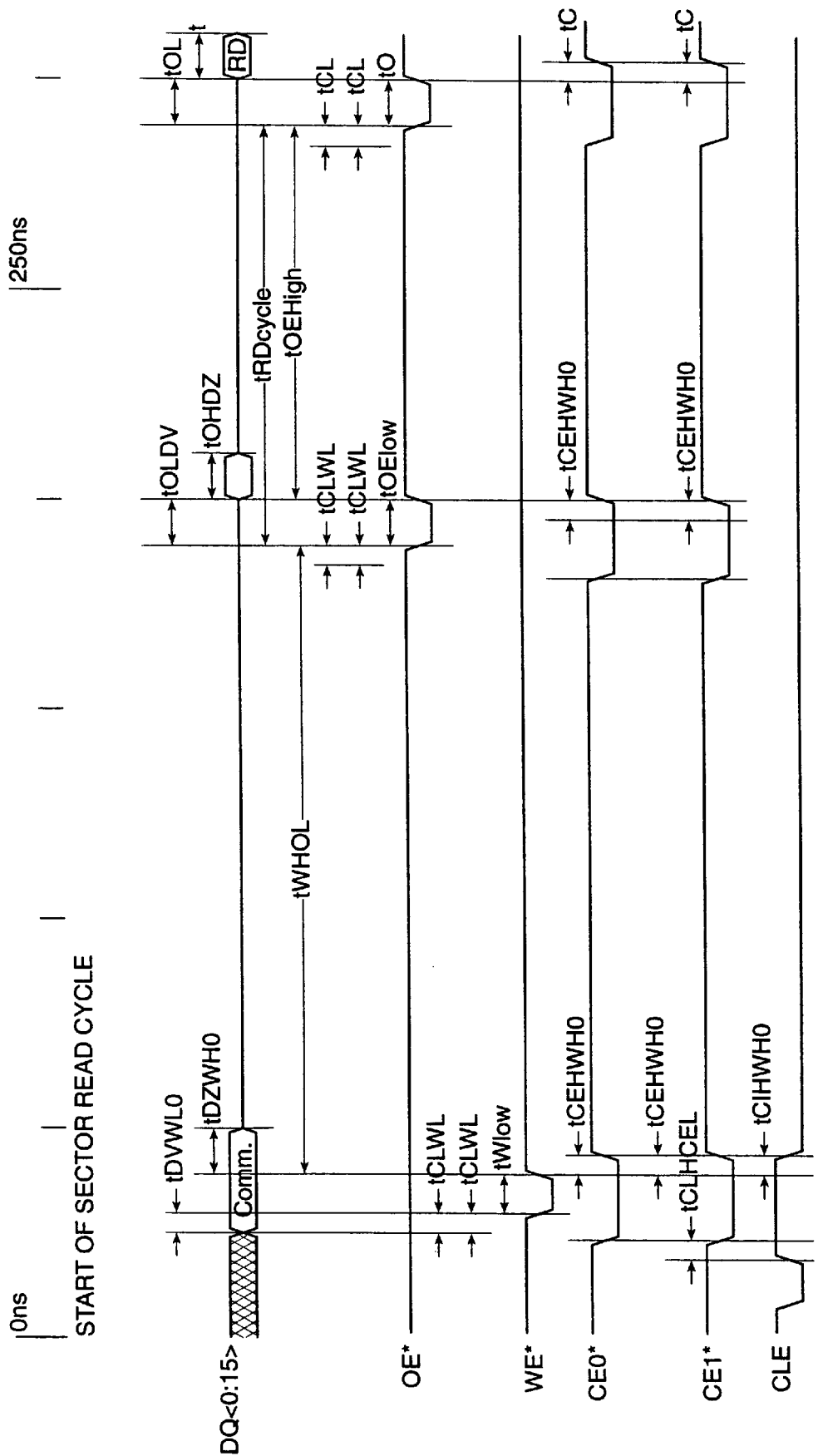
FIG. 7 depicts a timing diagram for reading a sector from a non-volatile memory component in accordance with one embodiment of the present invention.

FIG. 7 depicts a timing diagram for reading a sector from a non-volatile memory device in accordance with one embodiment of the present invention. The read sector sequence begins with CLE going high. Then CE0* and CE1* go low to select the non-volatile memory device. Before WE* goes low the data bus holds the read sector command and the sector number to be accessed. The read sector command is read into chip command register 304 and the sector address is written into sector address register 308. A zero value is written into word address register 310.

After WE* goes high, CE0* and CE1* may go high while CLE should go low. Non-volatile memory device 206 then expects to be read 264 times, once for each word in the sector. Each word read begins with CE0* and CE1* going low. This is followed by OE* going low. After OE* goes low, word address register 310 is incremented. After a delay, the data bus is asserted with the contents of output register 312 which holds the value of the next word to be read. After OE* goes high, ending the reading of a particular word, CE0* and CE1* may go high and the data bus pins of non-volatile memory device 206 are set at high impedance.

Figure 8:
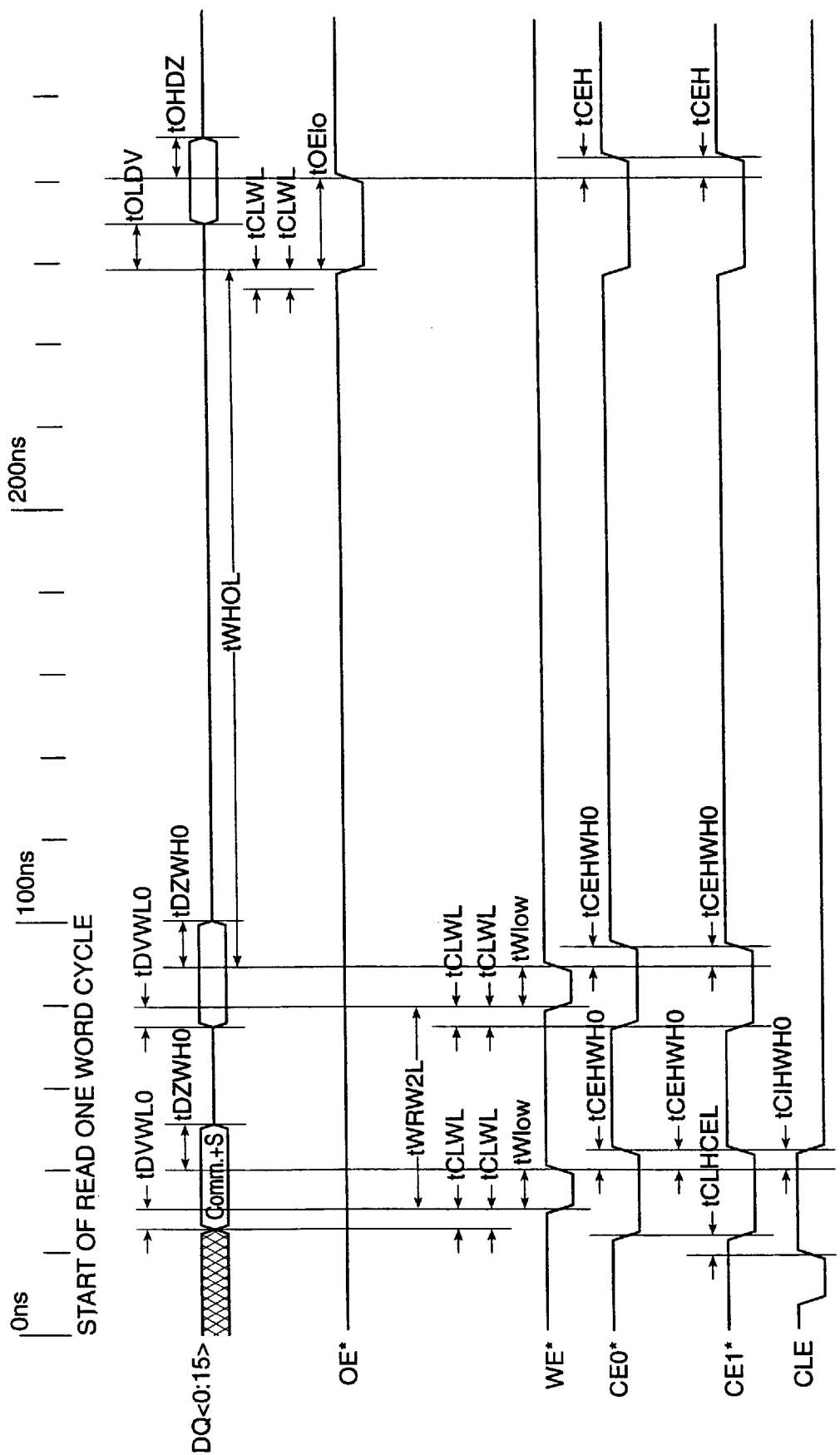
FIG. 8 depicts a timing diagram for reading a single word from a non-volatile memory component in accordance with one embodiment of the present invention.

FIG. 8 depicts a timing diagram for reading a single word from a non-volatile memory component in accordance with one embodiment of the present invention. The read word sequence begins with CLE going high. This is followed by both CE0* and CE1* going low. Prior to WE* going low for the first time the data bus holds the read word command and the sector number for the word to be read. The read word command is read into chip command register 304 and the sector a number is read into sector address command 308. After WE* goes high, CE0* and CE1* may go high. CLE goes low at this time. Before WE* goes low for the second time, CE0* and CE1* should be low. Also the data bus should hold the desired word address. The desired word address is read into word address register 310.

After WE* goes high again, CE0* and CE1* may go high and CLE should go low. Before, OE* goes low, CE0* and CE1 should already be low. After OE* goes low, non-volatile memory device 206 asserts the data bus with the contents of the word at the current address location. After OE* goes high CE0* and CE1* may go high and the data bus may return to a high impedance state.

Figure 9:
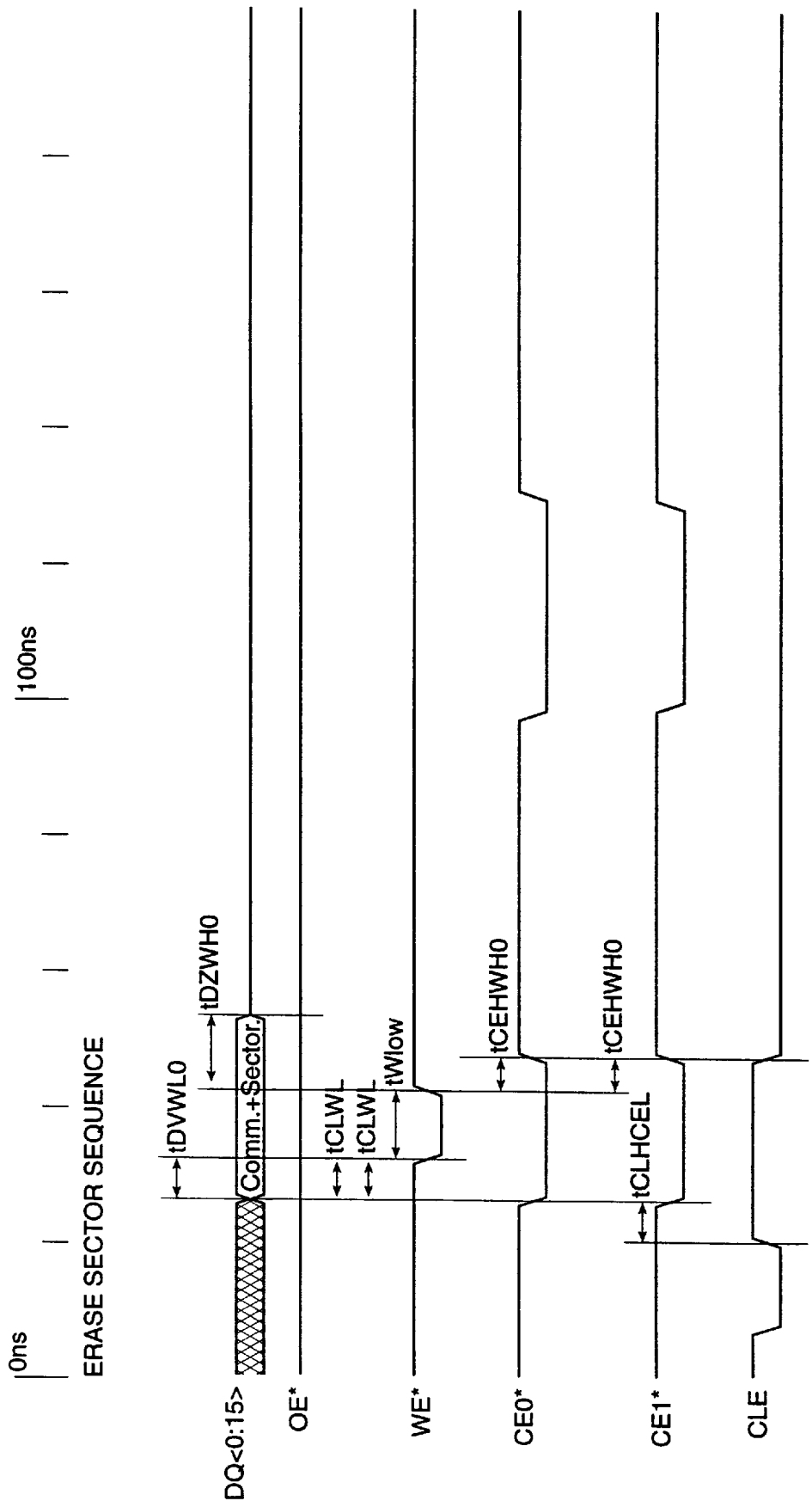
FIG. 9 depicts a timing diagram for erasing a sector from a non-volatile memory component in accordance with one embodiment of the present invention.

FIG. 9 depicts a timing diagram for erasing a sector from a non-volatile memory device in accordance with one embodiment of the present invention. There are three erasure mechanisms: sector, block, and multi-block. Associated with the erasure mechanism are 64 bits, which indicate erase protection for each block. Each block has one bit associated with it called the protection bit. If this bit is set to one, no erasure operation will be performed. The unprotect command forces all 64 block protection bits to zero. The protect command sets a specified block protection bit to 1. The specified block number will be found in word address register 310. The erase block command will take the top six bits of sector address register 308 as the block to be erased. If the block protection bit for the specified block is set to 1 and the erase operation is not performed. The multi-erase block command erases all blocks which do not have their protection bits to 1. The unprotect command forces every block protection bit to be 0. The block protect command forces the protection bit for the block referenced by sector address register 308 to be set to 1. All of these commands are implemented by use of extended command register 306. Timing for writing to extended command register 306 is given by FIG. 6.

Figure 10:
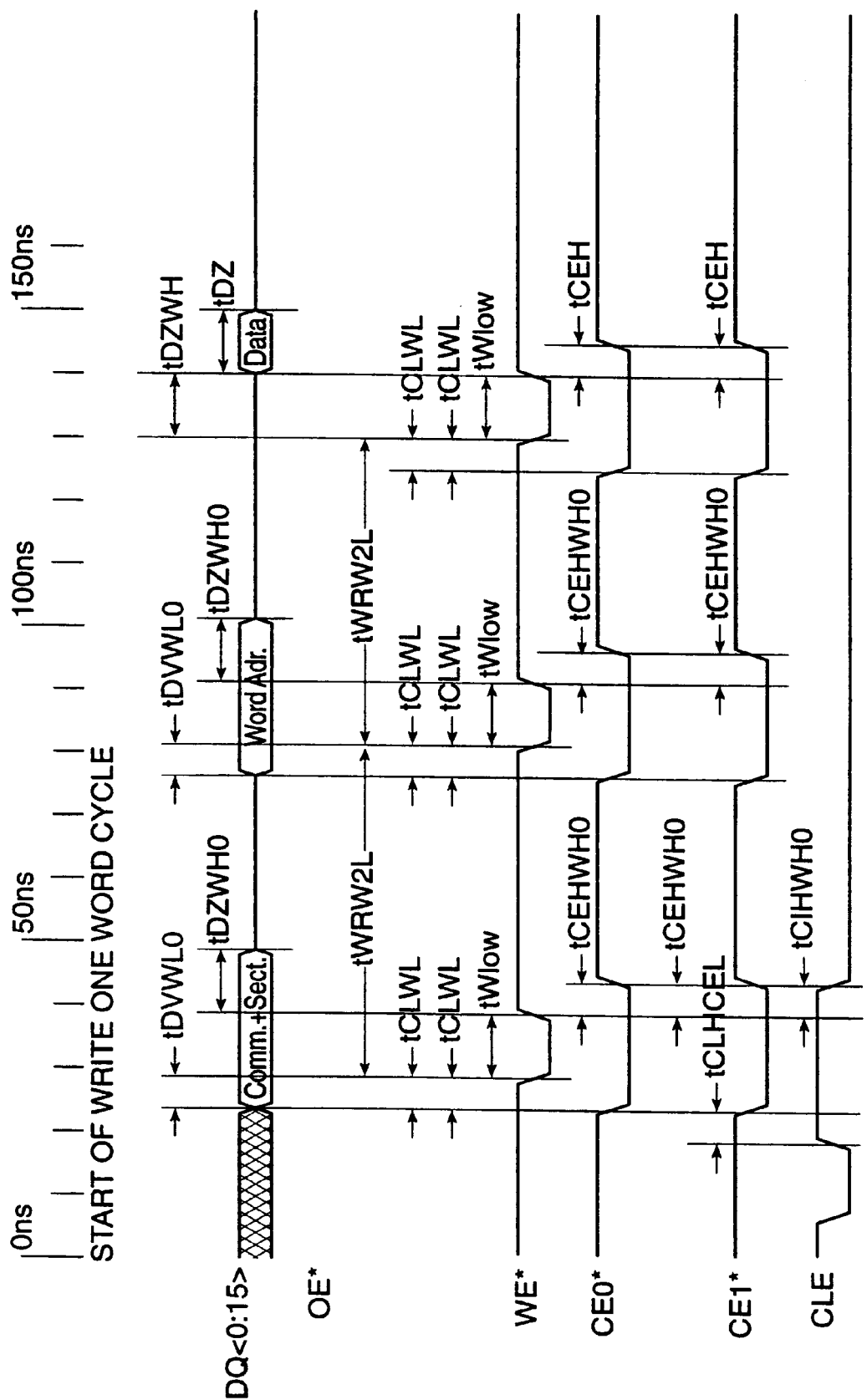
FIG. 10 depicts a timing diagram for writing a single word in accordance with one embodiment of the present invention.

FIG. 10 depicts timing for writing a single word in accordance with one embodiment of the present invention. Writing a word begins with CLE being asserted. Then both CE0* and CE1* go low. Before WE* goes low the data bus includes the write word command and the sector address corresponding to the sector to which the word is to be written. The write word command is written into chip command register 304 and the sector address is written to sector address register 308. After WE* goes high, CE0* and CE1* may go high and CLE should go low. Before WE* goes low for a second time, both CE0* and CE1* should go low. Also before WE* goes low for a second time, the data bus should include the word address of the word to be written. Then when WE* goes low for a second time, this word address is written to word address register 310. After WE* goes high again, CE0* and CE1* may go high while CLE goes low. Before WE* goes low for a third time, CE0* and CE1* should go low and the data bus will be asserted by non-volatile memory interface device 202 with the word to be written to the specified word address location. When WE* goes low for a third time, the word is written to the specified word location on non-volatile memory device 206.

The following timing constants and relationships hold for FIGS. 6–10.

| Name | Min (ns) | Description |
|---|---|---|
| CEHWHO | 5 | Delay after CE goes hi after WE first goes hi |
| CEL2L | 25 | Minimum time between CE going low twice |
| C1HWHO | 5 | Delay after WE first goes high before CLE goes low |
| CLWL | 5 | Time CE 13 low before WE Low |
| CLHCEL | 5 | Time CLE must be high before CEs go low |
| DVWLO | 5 | Time before write command sector strobe for Data Valid |
| DZCHR | 10 | Time after entering Reset Mode before DQ and RY/BY* are hi-Z |
| DZWHO | 10 | Time from WE first going high to DQ in Hi-Z |
| OEHigh | 50 | Minimum time OE* can be High |
| OELow | 10 | Minimum time OE* must be low |
| OLDV | 10 | Delay from OE* going low until Data Valid |
| OHDZ | 10 | Time from OE* going high to Data Hi-Z |
| RDcycle | 100 | Read Cycle Access Time |
| Wlow | 10 | Minimum time WE must be low |

FIGS. 11A–11I depict the timing of simultaneous access to multiple non-volatile memory devices in accordance with one embodiment of the present invention. In FIGS. 11A–11I, sectors on four non-volatile memory devices are read from simultaneously.

Figure 11A:
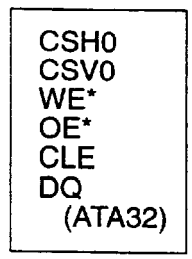
FIGS. 11A–11I depict interleaved access to multiple non-volatile memory components in accordance with one embodiment of the present invention.
Figure 11A:
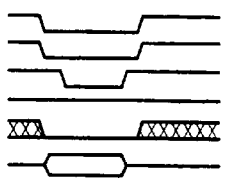
Figure 11A:
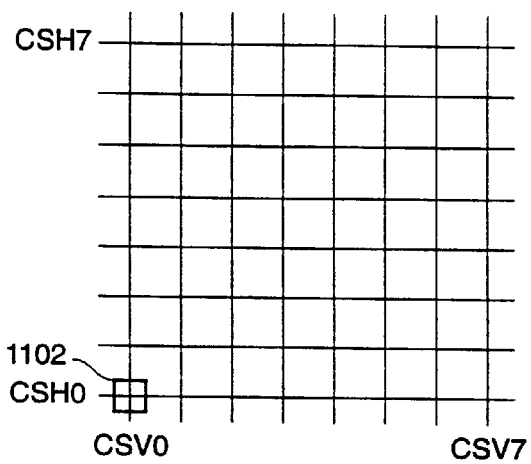

FIG. 11A depicts the time for sending a read sector command to a particular non-volatile memory device 1102. Only the horizontal and vertical chip selects signals corresponding to CE0* and CE1* for non-volatile memory device 1102 are asserted, CSH0 and CSV0. When WE* is low the data bus contains the read sector command and the sector address of the sector to be read on non-volatile memory device 1102.

Figure 11B:
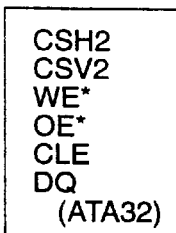
Figure 11B:
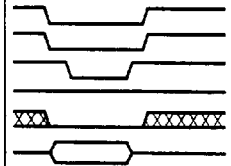
Figure 11B:
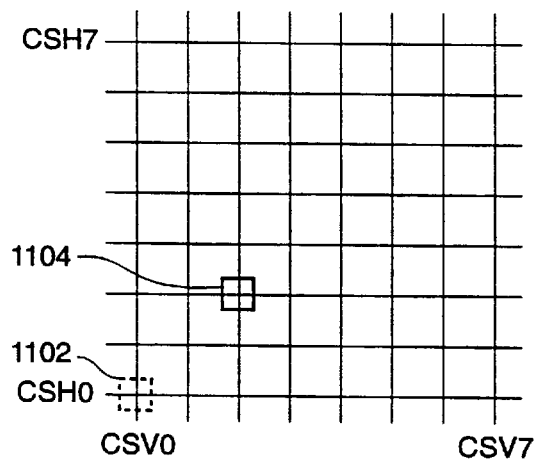

Next, as shown in FIG. 11B, a similar read sector command is sent to a second non-volatile memory device 1104. Second non-volatile memory device 1104 is selected by signals CSH2 and CSV2. While second non-volatile memory device 1104 is being addressed with a new read sector command, non-volatile memory device 1102 may be preparing its initial response to the original read sector command.

Figure 11C:
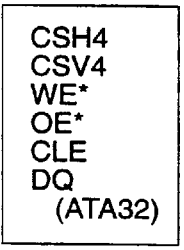
Figure 11C:
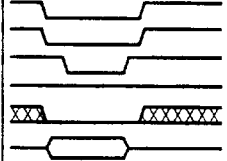
Figure 11C:
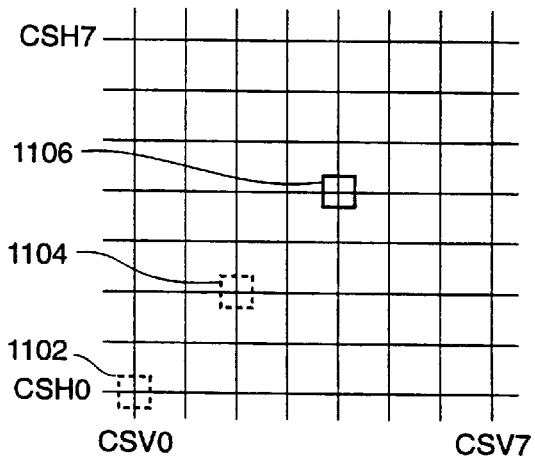
Figure 11D:
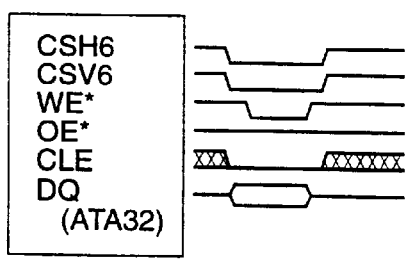
Figure 11D:
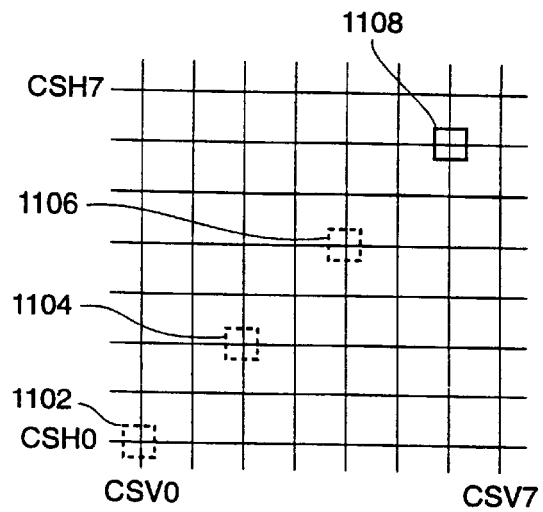

Then as shown in FIG. 11C, the third non-volatile memory device 1106 is addressed with its own read sector command. Third non-volatile memory device 1106 is selected by activation of chip select signal CSH4 and CSV4. Then, as shown in FIG. 11D, a fourth non-volatile memory device 1108 is sent a read sector command by activating select signal CSH6 and CSV6.

Figure 11E:
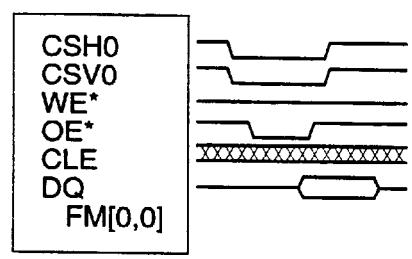
Figure 11E:
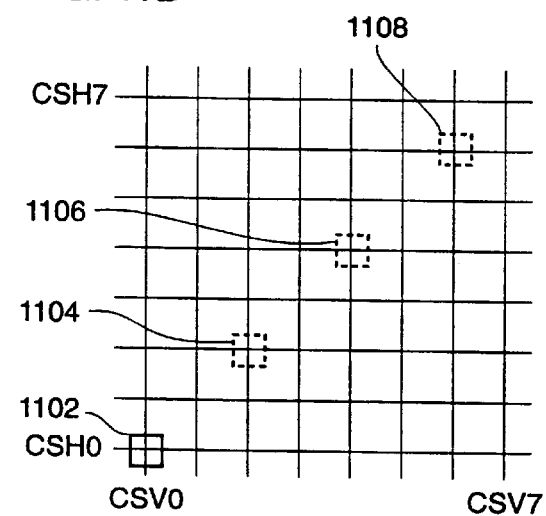
Figure 11F:
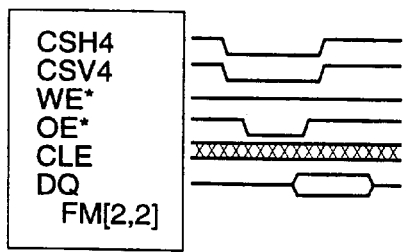
Figure 11F:
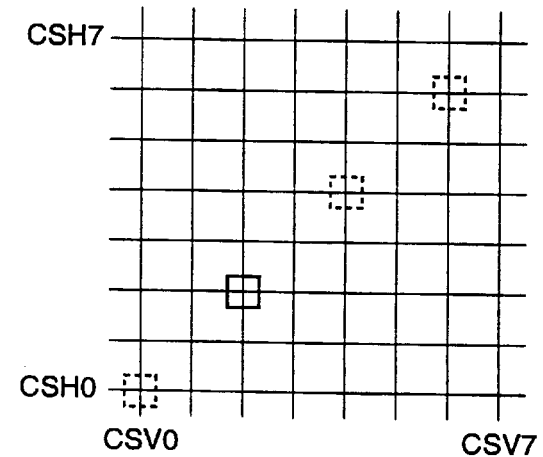
Figure 11G:
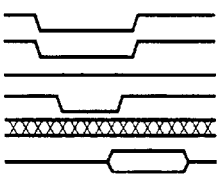
Figure 11G:
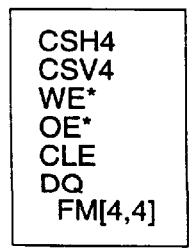
Figure 11G:
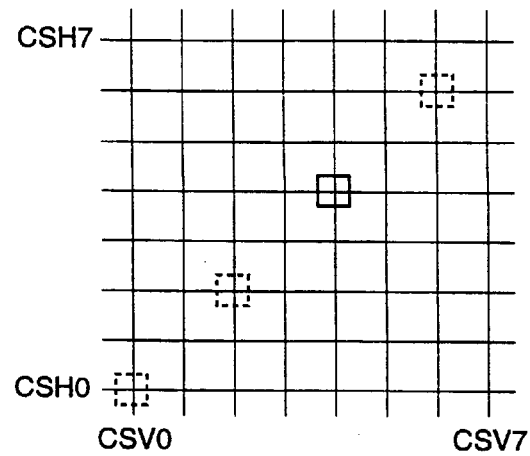
Figure 11H:
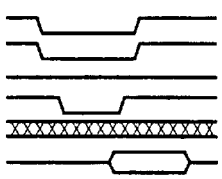
Figure 11H:
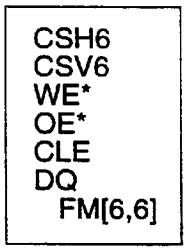
Figure 11H:
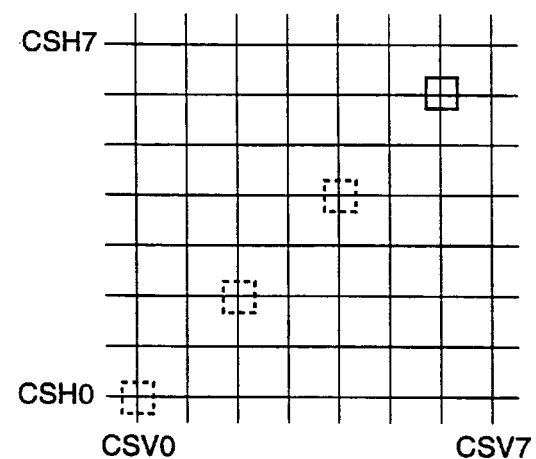
Figure 11I:
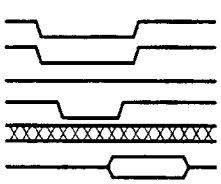
Figure 11I:
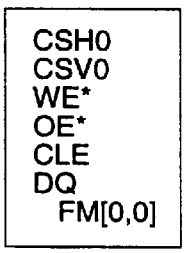
Figure 11I:
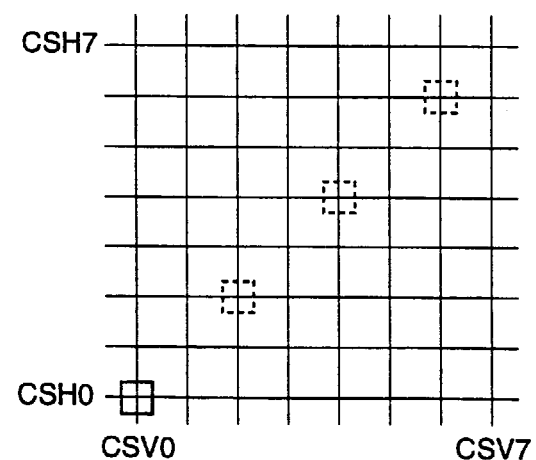

By now, first non-volatile memory device 1102 is prepared to read out the first word of the sector being accessed. This word is stored in output register 312. FIG. 11E show the timing for reading the first word of the addressed sector on first non-volatile memory device 1102. Reading then continues across the four commanded non-volatile memory devices, one word at a time. FIG. 11F shows the timing for reading out the first word of the addressed sector on second non-volatile memory device 1104. FIG. 11G shows the timing for reading out the first word of the addressed sector on third non-volatile memory device 1106. FIG. 11H shows the time for reading out the first word of the address sector of non-volatile memory device 1108. Then, the interleaved reading process returns to first non-volatile memory device 1102 where the second word of the addressed sector is read out as shown in FIG. 11I.

Figure 12:
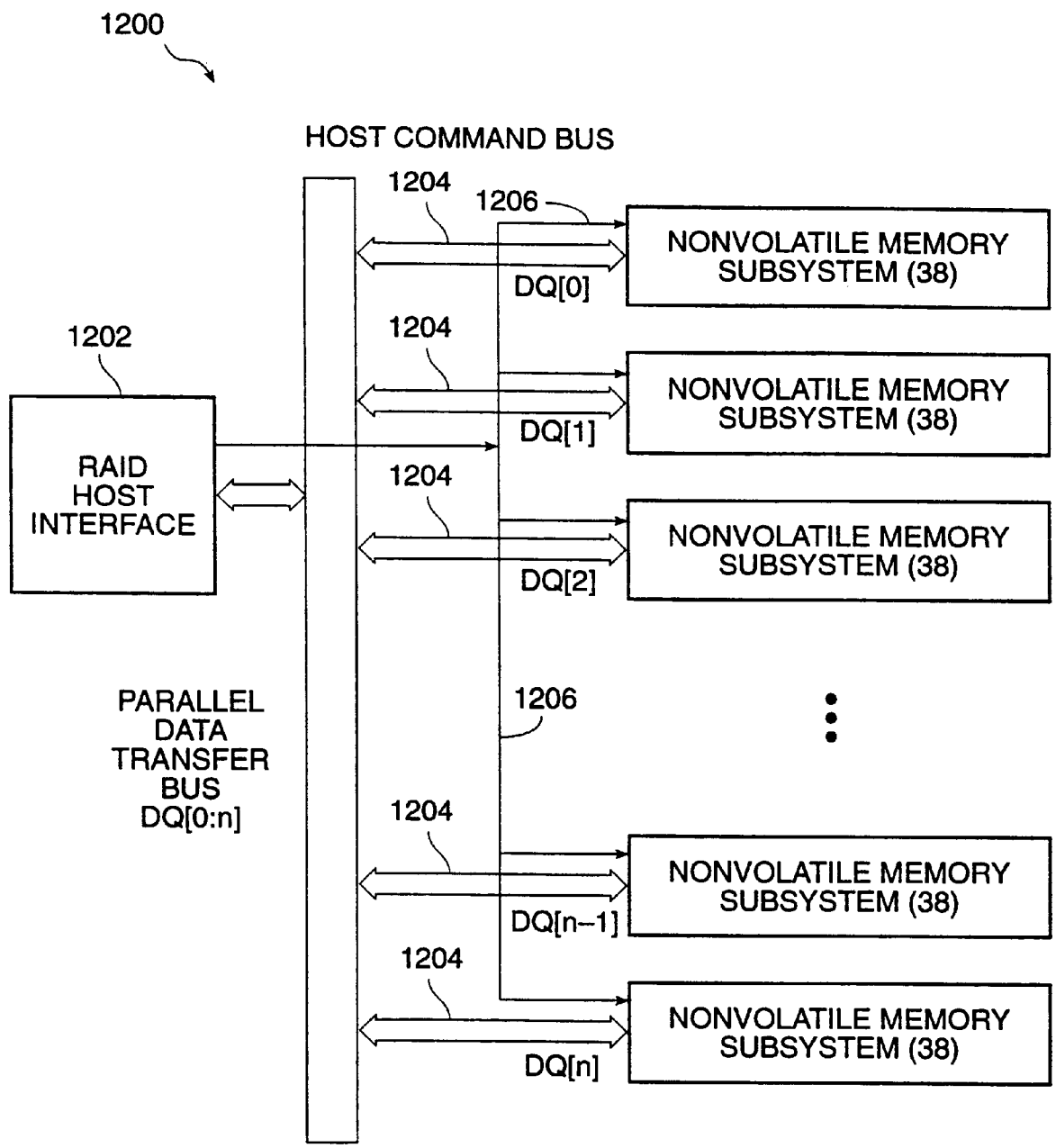
FIG. 12 is a diagram depicting multiple non-volatile memory systems in a RAID configuration according to one embodiment of the present invention.

FIG. 12 is a diagram depicting multiple non-volatile memory systems in a RAID configuration 1200 according to one embodiment of the present invention. Each non-volatile memory system 38 operates as a disk drive would in a RAID array as known to those of skill in the art. A RAID host interface 1202 is coupled to host bus 12. There are n non-volatile memory systems 38. Each non-volatile memory subsystem 38 is coupled to RAID host interface 1200 by its own independent data bus 1204. A host command bus 1206 also interconnects RAID host interface 1202 and non-volatile memory systems 38. The non-volatile memory subsystems 38 receive commands from RAID host interface 1202 via host command bus 1206 as they would from host bus 12. Host command bus 1206 may also carry status feedback signals returned from non-volatile memory systems 38.

In the foregoing specification, the invention has been described with reference to specific exemplary embodiments thereof. It will, however be evident of various modifications and changes may be made there unto without departing from the broad spirit and scope of the invention as set forth in the appending claims and their full scope of equivalents.

What is claimed is:

1. A method of operating a plurality of non-volatile memory devices comprising the steps of:

selecting a first non-volatile memory device to initiate a selected state of said first non-volatile memory device;

during said selected state, transmitting information identifying a location to be accessed at said first non-volatile memory device; thereafter causing said location identifying information to be stored in a location register of said first non-volatile memory device;

after transmitting said location identifying information, terminating said selected state of said first non-volatile memory device;

reselecting said first non-volatile memory device to again initiate said selected state of said first non-volatile memory device; and thereafter accessing a data word from said first non-volatile memory device, said data word being stored at a location determined by said location identifying information.

2. The method of claim 1 wherein said selecting, transmitting, and terminating steps are repeated for a second non-volatile memory device prior to reselecting said first non-volatile memory device.

3. The method of claim 1 wherein said non-volatile memory devices share a common data bus.

4. The method of claim 3 wherein said transmitting step comprises transmitting said sector identifying information via said data bus.

5. The method of claim 3 wherein said accessing step comprises reading said data word from said first non-volatile memory device via said data bus.

6. The method of claim 5 wherein accessing step comprises writing said data word to said first non-volatile memory device via said data bus.

7. The method of claim 1 further comprising the step of after said accessing step, again terminating said selected state of said non-volatile memory device.

8. The method of claim 7 wherein only a single data word is accessed at said non-volatile memory device after said reselecting step and prior to said step of again terminating said selected state.

9. The method of claim 1 wherein said selecting step comprises selecting only said first non-volatile memory device among said plurality of non-volatile memory devices.

10. The method of claim 8 wherein said selecting step comprises presenting said first non-volatile memory device with a pattern of input states representing a select address of said first non-volatile memory device.

11. The method of claim 5 wherein between said terminating step and said reselecting step said first non-volatile memory device internally retrieves said first selected word into an output register and maintains contents of said output register until said reselecting step.

12. The method of claim 7 wherein said location identifying information identifies a multi-word sector and wherein said reselecting and accessing steps are repeated for successive locations of said sector.

13. The method of claim 12 wherein one or more other non-volatile memory devices of said plurality are accessed while said first non-volatile memory device is not in a selected state.

14. The method of claim 1 further comprising the steps of:

selecting a second non-volatile memory device to initiate a selected state of said second non-volatile memory device;

transmitting an erasure command to said second non-volatile memory device designating a memory location to be erased; and erasing said designated memory location.

15. The method of claim 13 wherein said transmitting step comprises transmitting an erasure command designating a plurality of memory locations to be erased and wherein said erasing step comprises erasing said plurality of designated memory locations.

16. A method of operating a plurality of non-volatile memory devices comprising the steps of:
   selecting a first non-volatile memory device to initiate a selected state of said first non-volatile memory device;
   during said selected state, transmitting information identifying a location to be accessed at said first non-volatile memory device; thereafter
   after transmitting said location identifying information, terminating said selected state of said first non-volatile memory device;
   reselecting said first non-volatile memory device to again initiate said selected state of said first non-volatile memory device; and thereafter
   accessing a data word from said first non-volatile memory device, said data word being stored at a location determined by said location identifying information.

17. A non-volatile memory system comprising:
   a plurality of non-volatile memory devices, each non-volatile memory device being driven into a selected state by a particular pattern of selection line input states;
   a memory interface system that performs the steps of:
      activating selection line input states of a first non-volatile memory device to initiate a selected state of said first non-volatile memory device;
      during said selected state, transmitting information identifying a location to be accessed at said first non-volatile memory device; thereafter
      terminating said selected state of said first non-volatile memory device after transmitting said location identifying information;
      reselecting said first non-volatile memory device to again initiate said selected state of said first non-volatile memory device; and thereafter
      accessing a data word from said first non-volatile memory device, said data word being stored at a location determined by said location identifying information.

18. The non-volatile memory system of claim 17 wherein said memory interface system repeats said selecting, transmitting, and terminating steps for a second non-volatile memory device prior to reselecting said first non-volatile memory device.

19. The non-volatile memory system of claim 17 further comprising a common data bus shared by said plurality of non-volatile memory devices.

20. The non-volatile memory system of claim 19 wherein said memory interface system transmits said sector identifying information via said data bus.

21. The non-volatile memory system of claim 20 wherein said accessing step comprises reading said data word from said first non-volatile memory device via said data bus.

22. The non-volatile memory system of claim 21 wherein accessing step comprises writing said data word to said first non-volatile memory device via said data bus.

23. The non-volatile memory system of claim 17 wherein said memory interface system further performs a step of after said accessing step, again terminating said selected state of said non-volatile memory device.

24. The non-volatile memory system of claim 23 wherein only a single data word is accessed at said non-volatile memory device after said reselecting step and prior to said step of again terminating said selected state.

25. The non-volatile memory system of claim 17 wherein said selecting step comprises selecting only said first non-volatile memory device among said plurality of non-volatile memory devices.

26. The non-volatile memory system of claim 24 wherein said selecting step comprises presenting said first non-volatile memory device with a pattern of input states representing a select address of said first non-volatile memory device.

27. The non-volatile memory system of claim 21 wherein between said terminating step and said reselecting step said first non-volatile memory device internally retrieves said first selected word into an output register and maintains contents of said output register until said reselecting step.

28. The non-volatile memory system of claim 23 wherein said location identifying information identifies a multi-word sector and wherein said reselecting and accessing steps are repeated for successive locations of said sector.

29. The non-volatile memory system of claim 28 wherein one or more other non-volatile memory devices of said plurality are accessed while said first non-volatile memory device is not in a selected state.

30. The non-volatile memory system of claim 17 wherein said memory interface further performs the steps of:
   selecting a second non-volatile memory device to initiate a selected state of said second non-volatile memory device;
   transmitting an erasure command to said second non-volatile memory device designating a memory location to be erased; and
   erasing said designated memory location.

31. The non-volatile memory system of claim 30 wherein said transmitting step comprises transmitting an erasure command designating a plurality of memory locations to be erased and wherein said erasing step comprises erasing said plurality of designated memory locations.

32. The non-volatile memory system of claim 17 further comprising:
   a translator within said memory interface system that receives disk-drive protocol commands and controls said selecting and transmitting steps to fulfill said disk-drive protocol commands.

33. The non-volatile memory system of claim 17 wherein said disk-drive protocol commands are ATA commands.

34. A plurality of non-volatile memory systems as recited in claim 17 in combination with a RAID host interface that is coupled to said non-volatile memory systems via a plurality of parallel data buses.

35. A computer system comprising:
   a central processing unit;
   a host bus coupled to said central processing unit; and
   a non-volatile memory system coupled to said host bus for storing information accessible by said central processing unit;
   said non-volatile memory system comprising:
      a plurality of non-volatile memory devices, each non-volatile memory device being driven into a selected state by a particular pattern of selection line input states;
      a memory interface system that performs the steps of:
         activating selection line input states of a first non-volatile memory device to initiate a selected state of said first non-volatile memory device;
         during said selected state, transmitting information identifying a location to be accessed at said first non-volatile memory device; thereafter terminating said selected state of said first non-volatile memory device after transmitting said location identifying information;

reselecting said first non-volatile memory device to again initiate said selected state of said first non-volatile memory device; and thereafter accessing a data word from said first non-volatile memory device, said data word being stored at a location determined by said location identifying information;

a translator within said memory interface system that receives disk-drive protocol commands from said host bus and controls said selecting and transmitting steps to fulfill said disk-drive protocol commands.

36. A non-volatile memory interface comprising:

a selection circuit that selects a first non-volatile memory device to initiate a selected state of said first non-volatile memory device;

a location transmitting circuit that, during said selected state, transmitting information identifying a location to be accessed at said first non-volatile memory device;

a selected state terminating circuit that, after transmission of said location identifying information, terminates said selected state of said first non-volatile memory device;

a reselection circuit that reselects said first non-volatile memory device to again initiate said selected state of said first non-volatile memory device; and an access circuit that accesses a data word from said first non-volatile memory device, said data word being stored at a location determined by said location identifying information.

* * * * *